United States Patent
Leibowitz

[11] 3,944,333
[45] Mar. 16, 1976

[54] ELECTROCHROMIC DISPLAY WITH POROUS SEPARATOR

[75] Inventor: Marshall Leibowitz, Englewood, N.J.

[73] Assignee: Timex Corporation, Waterbury, Conn.

[22] Filed: Jan. 13, 1975

[21] Appl. No.: 540,481

[52] U.S. Cl. .......................... 350/160 R
[51] Int. Cl.² ......................... G02F 1/36
[58] Field of Search ................. 350/160 R

[56] References Cited
UNITED STATES PATENTS

| | | |
|---|---|---|
| 3,807,832 | 4/1974 | Castellion .................. 350/160 R |
| 3,844,636 | 10/1974 | Maricle et al. ............... 350/160 R |

Primary Examiner—William L. Sikes

[57] ABSTRACT

An electrochromic display device having transparent electrodes on a substrate and coated with electrochromic material for selectively displaying optical patterns, a counter-electrode on a parallel substrate also coated with electrochromic material, a thin porous separator membrane for closely spacing the substrates, the separator pores saturated with liquid electrolyte contacting the electrochromic layers and pigment providing a contrasting background for the first mentioned electrochromic layer and hiding the second electrochromic layer.

9 Claims, 2 Drawing Figures

ELECTROCHROMIC DISPLAY WITH POROUS SEPARATOR

BACKGROUND OF THE INVENTION

This invention relates generally to electrooptical displays of the type using electrochromic material which undergoes reversible color changes upon the application of an electric field. More particularly, the invention relates to an improved sandwich construction for an electrochromic display.

It is known that some materials exhibit the property of existing in more than one oxide state wherein the material in one state exhibits different optical properties from the material in another state. Examples of such materials are set forth in U.S. Pat. No. 2,319,765—Talmey issued May 18, 1943 and U.S. Pat. No. 3,521,941—Deb et al issued July 28, 1970. It is also known that a reversible electric field applied to electrochromic materials may be used to selectively produce visible images and to erase such images as described in U.S. Pat. No. 1,068,744—Hutchison issued July 29, 1913 and in the aforementioned Deb patent.

Various systems have been used in an electrooptic display such as liquid systems with a coloring material as the electrolyte per U.S. Pat. No. 3,283,656—Jones et al issued Nov. 8, 1966 solid state systems with no electrolyte per U.S. Pat. No. 3,560,078—McIntyre et al issued Feb. 2, 1971, or systems employing a gelled electrolyte per U.S. Pat. No. 3,704,057 to Beegle issued Nov. 28, 1972.

In some cases, as with the present invention, it is preferred to employ a liquid electrolyte for ion transfer between spaced electrochromic layers. This gives rise to problems of sealing the display against leakage and providing for changes in thermal expansion of the electrolyte which can require a flexible seal. However, if very close spacing is employed, which would also reduce temperature effects and allow lower operating voltage, there is a problem of hiding the counter-electrode so as to get good contrast between the electrochromic material on the image segments and the background around the segments.

It has been suggested in U.S. Pat. No. 3,807,832—Castellion issued Apr. 30, 1974 that an electrochromic mirror, having no discrete display characters, can employ a metallic reflecting surface having pores to allow a liquid electrolyte to permeate the reflective layer. However in an image display device, it is preferably desired to have a contrasting, but not necessarily reflective, background for the optical characters of electrochromic material, dependent on the optical characteristics of the electrochromic material.

Accordingly, one object of the present invention is to provide an improved electrochromic display of the type using liquid electrolyte which provides improved resistance to the effects of temperature change.

Another object of the invention is to provide an improved electrochromic image display with improved means for providing contrasting background for the images.

Still another object of the invention is an improved electrochromic display which allows closer spacing between spaced substrates using a liquid electrolyte between electrochromic layers.

SUMMARY OF THE INVENTION

Briefly stated, the invention is practiced by providing a first substrate with transparent electrodes and first electrochromic layers thereon, a second substrate with counter-electrode and a second electrochromic layer thereon, porous separator means closely spacing said substrates, said separator means being filled with liquid electrolyte, and pigment means associated with separator means providing contrast for the electrochromic layers on the first substrate and hiding the electrochromic layer on the second substrate.

DRAWINGS

Further objects and advantages of the invention will be better understood by reference to the following description, taken in connection with the accompanying drawings, in which:

FIG. 1 is an exploded perspective view of an electrochromic display according to the present invention, and FIG. 2 is an enlarged horizontal cross section taken through an assembled display according to FIG. 1.

DESCRIPTION OF THE PREFERRED EMBODIMENT

Figure 1:
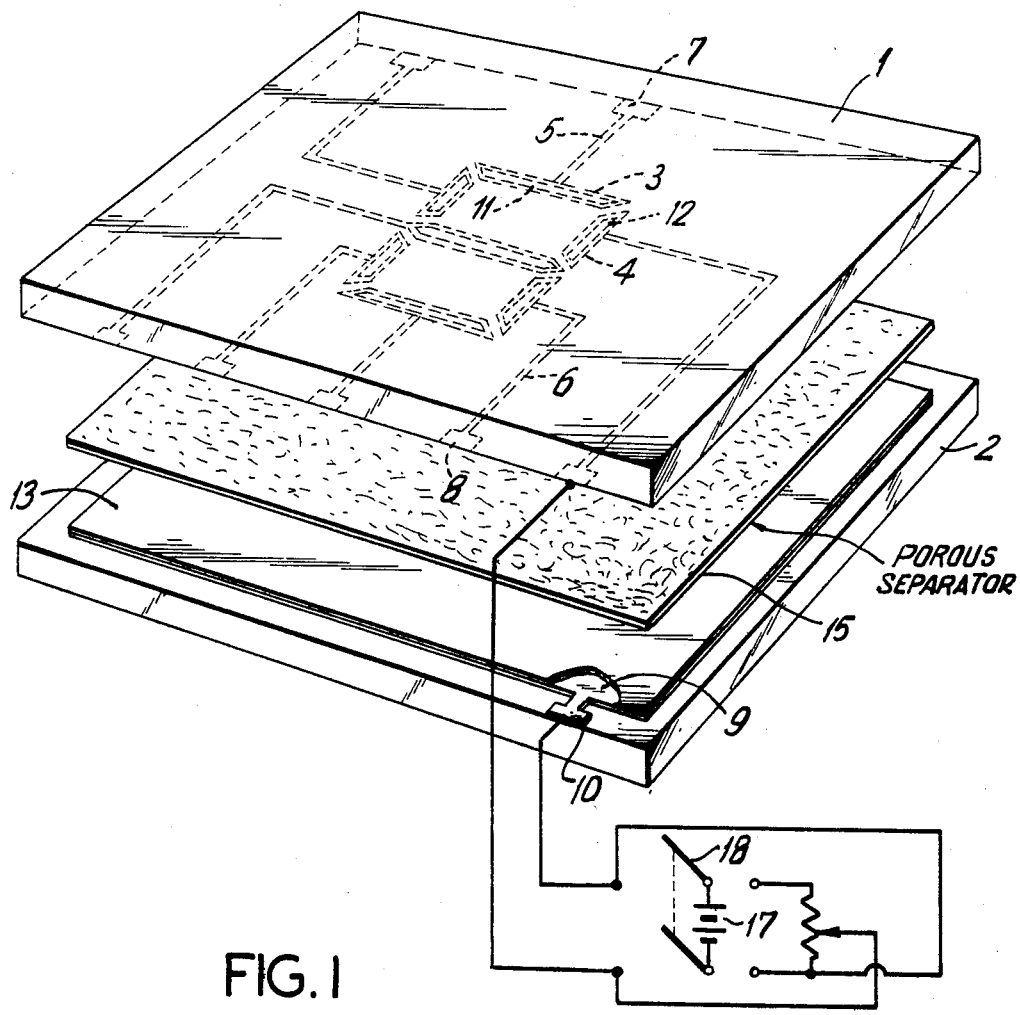

Referring now to FIG. 1, of the drawing, the electrochromic display is a sandwich construction of a first transparent substrate 1 and a second spaced substrate 2, which need not be transparent. Substrate 1 has a conductive pattern of transparent electrodes on the underside thereof such as segments 3, 4 of a pattern which can be selectively actuated to form digits or other optical patterns via conductive leads 5, 6 leading to terminals 7, 8. Substrate 1 may be of transparent glass or plastic with a selected pattern of transparent electrodes 3, 4 thereon of such material as tin oxide. The pattern may be etched on the substrate by using a commercially available material known as NESA glass and removing the conductive coating except for electrodes 3, 4.

The second substrate 2 has a conductive counter-electrode 9 thereon. Substrate 2 may be of glass, ceramic or plastic, coated with a suitable conductive layer to form counter-electrode 9 connected to terminal 10.

Coated on the transparent electrode segments 3, 4 and also on the counter-electrode 9 are layers of electrochromic material indicated as 11, 12, 13. The electrochromic layers 11, 12 on segments 3, 4 respectively are applied by suitable masking techniques to cover a smaller area than the electrodes so as to give good edge definition.

Many electrochromic materials are well known in the art, which change color according to the oxide state, which are well documented in the patents described in the foregoing discussion of prior art. The preferred electrochromic material used in the present invention is tungsten oxide. Preferably the tungsten oxide is deposited by vacuum evaporation, although other processes such as sputtering, electrochemical deposition, spray or silk screening may be used.

In accordance with the present invention, a porous separator means 15 is utilized between substrates. Although separating means 15 is shown in the drawing of FIG. 1 as a separate precut element, it may optionally be applied as a layer, either to substrate 1 or to substrate 2 as desired, by dip coating, spraying, knife blading or other methods. Optionally, the separator means 15 may be a separate precut film or membrane which is dropped into place.

The porous separator means should be very thin and uniform, on the order of 25 microns in thickness and ideally should be filled with a contrast-enhancing pigment. The preferred material for separator means 15 is porous polypropylene, although porous Teflon, porous polyethylene, nitrocellulose and cellulose nitrate have also been used with success. The separator means 15 should have pores of a size not exceeding 25 microns, preferably in the range of 0.1 to 5 microns. Its porosity should be such that, on the order of 50 percent or less of its total volume is comprised of solid material although this is not a critical number.

A commercially available material suitable for separator means 15 is "Celgard" microporous polypropylene manufactured by Celanese Corp. Another suitable material is Chemplast porous Teflon, manufactured by Chemplast, Inc.

In accordance with the present invention, pigment means are associated with the very thin separator means in the following preferred manner. Premixed in with the porous separator material is a pigment selected to provide the best contrast for the electrochromic layers 11, 12 and for hiding layer 13. One such suitable pigment is titanium dioxide which is white in color, provides good contrast with the upper layers 11, 12 of tungsten oxide electrochromic material and also hides the counter-electrode with electrochromic layer 13 beneath the pigmented separator means.

An alternate approach for associating the pigment means with the separator means is to deposit a layer of contrast-enhancing pigment flakes or powder on either of the electrochromic layers 11, 12 or 13. The layer can be desposited by spraying, painting, dipcoating and so forth. The separator means, which may now be transparent, is pressed or positioned on top of the pigment layer holding the powder or flakes stationary in the presence of an electrolyte. For this purpose titanium dioxide powder may be used. However an important consideration is that the particle size of the pigment must be larger than the hole size of the porous separator means, otherwise the particles may migrate through the separator pores and impair effectiveness of the display. As an example, 5 micron particles of titanium dioxide would be associated with separator means having holes on the order of 1 micron.

Other suitable pigments include mica flakes coated with a layer of high refractive index thereby imparting to the porous separator optical interference colors. These are produced by the Mearl Corp. and are known as mearlin Luster pigments.

Figure 2:
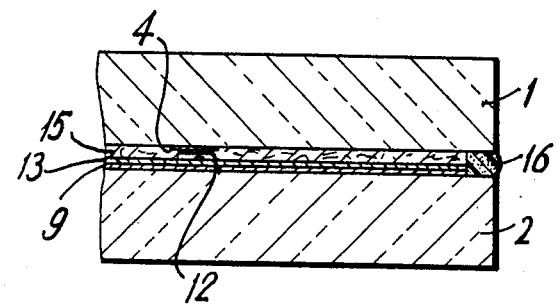

Reference to FIG. 2 of the drawing shows the assembled display. The two substrates 1, 2 are attached to one another by an adhesive 16, such as epoxy, the display filled with electrolyte and then sealed with adhesive around the remaining sides. The preferred electrolyte is dilute sulfuric acid or silicotungstic acid solution saturated with tungstic acid.

Suitable well-known means for actuating the display elements include means for applying an electric field from a battery 17 to a selected segment 4 via terminal 8 and the counter-electrode via a terminal 10. Means for reversing the polarity of the applied voltage to erase the image is indicated symbolically by a two-pole double-throw switch 18.

The porous separator means 15 has several significant functions in accordance with the present invention. First, it serves as a spacer to provide very close uniform spacing between substrates 1, 2 and hence the electrochromic layers. Secondly, it serves as a carrier for the liquid electrolyte, obviating the need of gelling substances. Thirdly, the separator structure serves to carry or to hold in place the pigment means so as to provide a contrast-enhancing background for the electrochromic layers 11, 12 on the upper image segments, while also hiding the electrochromic layer 13 on the counter-electrode.

Since the electrochromic layers are closely and uniformly spaced, significantly lower operating voltages may be used. The thermal expansion of the very thin film of liquid electrolyte is minimized, eliminating the previously required flexible seal.

While there has been described what is considered to be the preferred embodiment of the invention, other modifications will occur to those skilled in the art and it is desired to cover in the appended claims all such modifications as fall within the true spirit and scope of the invention.

I claim:

1. In an electrochromic display of the type having a first substrate with selectively actuatable transparent electrodes and first electrochromic layers thereon, and also having a second substrate with counter-electrode and second electrochromic layer thereon, the improvement comprising:

porous separator means applied as a layer and uniformly and closely spacing said first and second substrate members, the pores of said separator means being filled with liquid electrolyte, and pigment means held by said separator means and selected to provide contrast with said first electrochromic layers and disposed to hide said second electrochromic layer.

2. The combination according to claim 1, wherein said separator means is a layer with thickness on the order of 25 microns applied to the first substrate.

3. The combination according to claim 1, wherein said porous separator means is a layer with thickness on the order of 25 microns applied to said second substrate.

4. The combination according to claim 1, wherein said porous separator means comprises porous polypropylene.

5. The combination according to claim 1, wherein said electrolyte comprises a mixture of titanium dioxide, and dilute sulfuric acid.

6. The combination according to claim 1, wherein said pigment means is premixed in said separator means.

7. The combination according to claim 1, wherein said pigment means is a layer of powder on one of said electrochromic layers and held in place by said separator means, the separator means having pores smaller than the particle size of said powder.

8. The combination according to claim 1, wherein said pores are of a size in the range between 0.1 and 25 microns.

9. The combination according to claim 1, wherein said pores are of a size in the range of 0.1 to 5 microns.

* * * * *

Notice of Adverse Decision in Interference

In Interference No. 99,756, involving Patent No. 3,944,333, M. Liebowitz, ELECTROCHROMIC DISPLAY WITH POROUS SEPARATOR, final judgment adverse to the patentee was rendered July 1, 1980, as to claims 1, 4 and 6.

[*Official Gazette November 18, 1980.*]